United States Patent
Guirguis et al.

(10) Patent No.: US 10,486,369 B2
(45) Date of Patent: Nov. 26, 2019

(54) SYSTEMS, METHODS, AND APPARATUS FOR AUTOMATED SEALANT APPLICATION

(71) Applicant: The Boeing Company, Chicago, IL (US)

(72) Inventors: Martin Hanna Guirguis, Huntington Beach, CA (US); Cesar Mireles, Long Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/997,382

(22) Filed: Jun. 4, 2018

(65) Prior Publication Data
US 2018/0281300 A1    Oct. 4, 2018

Related U.S. Application Data

(62) Division of application No. 14/702,993, filed on May 4, 2015, now Pat. No. 9,987,795.

(51) Int. Cl.
*B29C 65/70* (2006.01)
*B05C 9/12* (2006.01)
(Continued)

(52) U.S. Cl.
CPC ............... *B29C 65/70* (2013.01); *B05C 9/12* (2013.01); *B05C 11/023* (2013.01);
(Continued)

(58) Field of Classification Search
CPC ..... F16B 33/004; B29C 65/70; B29C 66/863; B05C 9/12; B05C 5/02; B05C 11/023; B05D 1/26
See application file for complete search history.

(56) References Cited

U.S. PATENT DOCUMENTS

| 4,951,849 A | 8/1990 | Townsend et al. |
| 4,971,745 A | 11/1990 | Ferenc et al. |

(Continued)

FOREIGN PATENT DOCUMENTS

| EP | 2492550 A1 | 8/2012 |
| GB | 1443742 A | 7/1976 |

OTHER PUBLICATIONS

"U.S. Appl. No. 14/702,993, Ex Parte Quayle Action dated Jan. 26, 2018", 4 pages.

(Continued)

*Primary Examiner* — Robert B Davis
(74) *Attorney, Agent, or Firm* — Kwan & Olynick LLP

(57) ABSTRACT

Systems, methods, and apparatus are disclosed for shaping sealant applied to a fastener. Methods include pressing, using an end effector of a robotic arm, a dabbing tool against the sealant, the sealant sealing a surface of the fastener along a surface of an assembly, the pressing of the dabbing tool shaping an exterior surface of the sealant. Methods also include releasing an amount of solvent from the dabbing tool in response to the pressing, the amount of solvent reducing adhesion between the dabbing tool and the sealant, the amount of solvent being released, at least in part, from a porous member included in the dabbing tool. Methods further include disengaging the dabbing tool from the sealant after the shaping of the exterior surface of the sealant.

16 Claims, 11 Drawing Sheets

(51) Int. Cl.
| | |
|---|---|
| *B05C 11/02* | (2006.01) |
| *B29C 65/00* | (2006.01) |
| *B29L 31/30* | (2006.01) |
| *B05C 5/02* | (2006.01) |
| *F16B 33/00* | (2006.01) |
| *B05D 1/26* | (2006.01) |
| *B60K 15/03* | (2006.01) |
| *B64D 37/02* | (2006.01) |

(52) U.S. Cl.
CPC .............. *B29C 66/863* (2013.01); *B05C 5/02* (2013.01); *B05D 1/26* (2013.01); *B29L 2031/30* (2013.01); *B60K 15/03* (2013.01); *B64D 37/02* (2013.01); *F16B 33/004* (2013.01)

(56) References Cited

U.S. PATENT DOCUMENTS

| | | |
|---|---|---|
| 5,647,111 A | 7/1997 | Zienkiewicz et al. |
| 5,783,254 A | 7/1998 | Maynard |
| 6,547,880 B1 | 4/2003 | Krueger et al. |
| 6,908,642 B2 | 6/2005 | Hubert |
| 8,751,046 B2 | 6/2014 | Hartmann et al. |
| 9,061,313 B1 | 6/2015 | Williams et al. |
| 9,987,795 B2 | 6/2018 | Guirguis et al. |
| 2008/0111813 A1* | 5/2008 | Gatzke ............. G05B 19/41805 345/419 |
| 2008/0134971 A1 | 6/2008 | Bradley |
| 2014/0261956 A1 | 9/2014 | Wiseman et al. |
| 2016/0325489 A1 | 11/2016 | Guirguis et al. |

OTHER PUBLICATIONS

"U.S. Appl. No. 14/702,993, Examiner Interview Summary dated Feb. 6, 2018", 1 page.

"U.S. Appl. No. 14/702,993, Non Final Office Action dated Sep. 19, 2017", 8 pages.

"U.S. Appl. No. 14/702,993, Notice of Allowance dated Feb. 6, 2018", 7 pages.

"U.S. Appl. No. 14/702,993, Restriction Requirement dated Mar. 24, 2017", 6 pgs.

"European Application Serial No. 16168213.3, Search Report dated Nov. 4, 2016", 5 pgs.

"Chinese Application Serial No. 2016102108861, Office Action dated Jan. 30, 2019", 12 pgs.

"European Application Serial No. 16168213.3, Office Action dated Jul. 16, 2019", 5 pgs.

\* cited by examiner

SYSTEMS, METHODS, AND APPARATUS FOR AUTOMATED SEALANT APPLICATION

CROSS-REFERENCE TO RELATED APPLICATIONS

This application is a divisional application of U.S. application Ser. No. 14/702,993 assigned U.S. Pat. No. 9,987,795, filed May 4, 2015 and issued Jun. 5, 2018, which is incorporated by reference herein in its entirety for all purposes.

TECHNICAL FIELD

This disclosure generally relates to vehicles and machinery and, more specifically, to the application of sealant to such vehicles and machinery.

BACKGROUND

Vehicle components and assemblies may include interfaces or joints at which different parts or components of the vehicle have been joined together, as may occur during an assembly process associated with the vehicle. For example, a first part of an airplane may be coupled to a second part of the airplane via a joint or an interface between the first part and the second part. Moreover, the first and second parts may be coupled together using one or more fasteners such as nuts and bolts. The interface may be part of an assembly that is sealed or impermeable to a liquid. For example, the interface may join different parts of a fuel tank. Accordingly, a sealant may be applied to portions of the interface, such as the nuts and bolts, to seal any openings or spaces that may be included in the interface.

SUMMARY

Systems, method, and apparatus for manufacturing, using, and otherwise implementing automated application of sealant, and shaping sealant applied to a fastener are disclosed herein. Methods include pressing, using an end effector of a robotic arm, a dabbing tool against the sealant, the sealant sealing a surface of the fastener along a surface of an assembly, the pressing of the dabbing tool shaping an exterior surface of the sealant. Methods also include releasing an amount of solvent from the dabbing tool in response to the pressing, the amount of solvent reducing adhesion between the dabbing tool and the sealant, the amount of solvent being released, at least in part, from a porous member included in the dabbing tool. Methods further include disengaging the dabbing tool from the sealant after the shaping of the exterior surface of the sealant.

In some embodiments, the methods further include storing a first amount of solvent in a first layer of the porous member, and storing a second amount of solvent in a second layer of the porous member, the second amount being wicked away from the first amount of solvent stored in the first layer. In various embodiments, the first layer is positioned inside a chamber of the dabbing tool and has a surface defined, at least in part, by an interior surface of the chamber, and the second layer is positioned across an opening of the chamber. According to some embodiments, the methods also include providing, from an external reservoir, an additional amount of solvent to the porous member in response to the releasing. In some embodiments, the additional amount of solvent is received via a port in a housing of the dabbing tool. In various embodiments, the pressing of the dabbing tool shaping the exterior surface of the sealant reduces a protrusion of the sealant. According to some embodiments, the methods also include determining a position of the pressing based on engineering data associated with the assembly. In some embodiments, the engineering data comprises a three-dimensional representation of the assembly. In various embodiments, the methods also include determining if additional fasteners should be sealed, the determining being based on a plurality of designated positions identified based on the engineering data. According to some embodiments, the sealant is applied by a robotic sealant applicator coupled to a robotic arm. In some embodiments, the methods further include regulating a flow of solvent provided to the porous member using a regulator.

Additional methods are disclosed herein for applying and shaping sealant on a fastener. The methods include moving an end effector of a robotic arm to a position to align the end effector with a location of a fastener in an assembly, applying, using the end effector, an amount of sealant to the fastener, and pressing, using the end effector, a dabbing tool against the sealant, the sealant sealing a surface of the fastener along a surface of the assembly, the pressing of the dabbing tool shaping an exterior surface of the sealant. The methods further include releasing an amount of solvent from the dabbing tool in response to the pressing, the amount of solvent reducing adhesion between the dabbing tool and the sealant, the amount of solvent being released, at least in part, from a porous member included in the dabbing tool. The methods also include disengaging the dabbing tool from the sealant after the shaping of the exterior surface of the sealant.

In some embodiments, the methods further include storing a first amount of solvent in a first layer of the porous member, and storing a second amount of solvent in a second layer of the porous member, the second amount being wicked away from the first amount of solvent stored in the first layer. In various embodiments, the first layer is positioned inside a chamber of the dabbing tool and has a surface defined, at least in part, by an interior surface of the chamber, and wherein the second layer is positioned across an opening of the chamber. According to some embodiments, the methods also include rotating, using the end effector, the dabbing tool to face the fastener after the applying of the sealant. In some embodiments, the rotating rotates, using a rotating component, an orientation of a robotic sealant applicator and the dabbing tool. In various embodiments, the methods also include moving the dabbing tool to a plurality of designated positions using the robotic arm, the plurality of designated positions being determined based on engineering data associated with the assembly.

Further methods are also disclosed herein for applying and shaping sealant on a plurality of fasteners. The methods include moving an end effector of a robotic arm to a first fastener at a first position, pressing, using the end effector, a dabbing tool against a first sealant sealing a first surface of the first fastener along a surface of an assembly, the pressing of the dabbing tool shaping a first exterior surface of the first sealant, and releasing a first amount of solvent from the dabbing tool in response to the pressing, the first amount of solvent reducing adhesion between the dabbing tool and the first sealant, the first amount of solvent being released, at least in part, from a porous member included in the dabbing tool. The methods also include disengaging the dabbing tool from the first sealant after the shaping of the first exterior surface of the first sealant, determining, based on engineering data, if additional fasteners should be sealed, and moving the end effector to a second fastener at a second position responsive to determining that additional fasteners should be sealed.

In some embodiments, the methods also include pressing, using the end effector, the dabbing tool against a second sealant sealing a second surface of the second fastener along the surface of the assembly, the pressing of the dabbing tool shaping a second exterior surface of the second sealant, releasing a second amount of solvent from the dabbing tool in response to the pressing, the second amount of solvent reducing adhesion between the dabbing tool and the second sealant, the second amount of solvent being released, at least in part, from the porous member included in the dabbing tool, and disengaging the dabbing tool from the second sealant after the shaping of the second exterior surface of the second sealant. In various embodiments, the first fastener and the second fastener are included in a path of fasteners defined by the engineering data comprising a three-dimensional representation of the assembly.

While numerous embodiments have been described to provide an understanding of the presented concepts, the previously described embodiments may be practiced without some or all of these specific details. In other instances, well known process operations have not been described in detail so as to not unnecessarily obscure the described concepts. While some concepts have been described in conjunction with the specific examples, it will be understood that these examples are not intended to be limiting, and other suitable examples are contemplated within the embodiments disclosed herein.

DETAILED DESCRIPTION

Figure 1A:
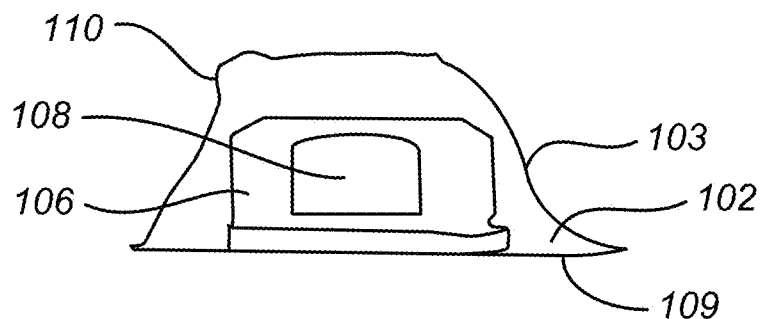
FIG. 1A illustrates a cross-section of an example of sealant applied to one or more fasteners, implemented in accordance with some embodiments.

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

In a manufacturing and assembly environment, various components of vehicles may be mechanically coupled with each other using various fasteners. A fastener may refer to one or more components that may be used to join components or parts of a vehicle. For example, fasteners may include nuts, bolts, screws, rivets, and various other types of threaded/unthreaded fasteners used in industry. As used herein, a fastener may also refer to a combination of elements that has been used to fasten different parts of the vehicle. For example, a fastener as described herein may refer to a combination of a nut and a bolt that may have been threaded together and installed at a particular location or position in an interface between two parts of the vehicle. Sealant may be applied to fasteners to seal, at least in part, the interface between the components that have been coupled with each other. For example, when installed in a fuel tank, sealant may prevent fuel from leaking out of the fuel tank via holes through which the fasteners are installed.

Accordingly, sealant may be applied to fasteners as a liquid or viscous material that subsequently hardens or solidifies. During or as a result of the application of the sealant, surface imperfections, such as protrusions and spindles, may form that may adversely impact systems of the vehicle during subsequent operation. Accordingly, after sealant has been applied to a fastener, or an exposed portion of a fastener such as an exposed bolt head, a mechanic may manually fare/shape the applied sealant so as to ensure that the cured sealant meets manufacturing specification tolerances which may specify zero allowance of sealant geometry that may become dislodged within a sealed compartment. A mechanic may use a spatula to accomplish such shaping of the sealant. However, such a manual process of shaping the sealant is time intensive and often utilizes more time than is available in a manufacturing environment. Furthermore, fasteners to be sealed are often located in narrow or confined compartments which are difficult for a human operative to reach.

Accordingly, various systems, methods, and apparatus are disclosed herein that automatically shape sealant applied to a fastener. As disclosed herein, the automatic shaping of sealant may utilize a robot that includes an end effector coupled to a dabbing tool. The dabbing tool may be configured to shape uncured sealant applied to a fastener according to a designated manufacturing specification or tolerance. Moreover, the dabbing tool may include one or more components, such as a porous member, which may store and release an amount of solvent to ensure that coupling between the dabbing tool and sealant is reduced. Accordingly, the robot may be configured to manipulate the end effector to different positions associated with different fasteners that have had sealant applied to them. The dabbing tool may be pressed against the applied sealant to impart a shape upon the uncured sealant. In some embodiments, the size and geometry of the dabbing tool may be configured based on the fasteners that are being sealed. For example, the dabbing tool's geometry may be configured based on the dimensions of acceptable tolerances of final cured sealant dimensions for a particular vehicle assembly which may be, for example, a lower wing panel or a fuel tank included in a plane. In various embodiments, one or more operations implemented to shape or stamp uncured solvent applied to a fastener may be performed in about 2 seconds. Accordingly, the automated sealant and dabbing systems, methods, and apparatus disclosed herein greatly increase accuracy and consistency during the assembly of a vehicle, which consequently greatly reduces rework and wasted resources.

FIG. 1A illustrates a cross-section of an example of sealant applied to one or more fasteners, implemented in accordance with some embodiments. As similarly discussed above, sealant, such as sealant 102 may be applied to fasteners, which may include nut 106 and bolt 108, which may be configured to fasten two components of a vehicle together. For example, the components of the vehicle may be panels or pieces of a fuel tank of a machine. In various embodiments, a machine as disclosed herein is a vehicle such as a spacecraft, an aircraft, a watercraft, a rotorcraft or other motor vehicle. In this example, nut 106 may be fastened to an interior surface of the fuel tank which may be in contact with jet fuel when the fuel tank is ultimately used as part of the airplane. Accordingly, sealant 102 may be applied to seal nut 106, bolt 108, and a hole through which bolt 108 may be inserted or threaded. As shown in FIG. 1A, surface 109 of sealant 102 may contact the interior surface of the fuel tank while exterior surface 103 may face an interior chamber of the fuel tank. As discussed above, the application of sealant 102 may be performed by an automated device or apparatus, such as a robot. The application of sealant 102 by the robot may result in an asymmetrical geometry of the sealant which includes an outward protrusion such as protrusion 110. In some embodiments, protrusion 110 may result from the robot terminating application of sealant 102 and pulling away from nut 106 and bolt 108. While protrusion 110 is shown as a ridge or bump, protrusion 110 may have a shape or geometry that extends farther from the main bulk of sealant 102, such as a spindle or thread-like geometry.

Figure 1B:
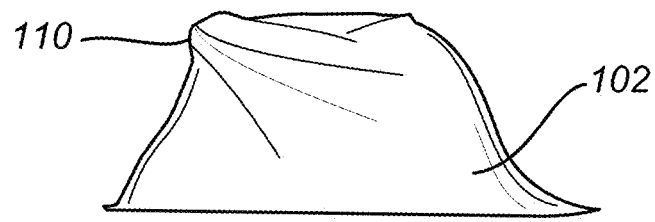
FIG. 1B illustrates side-view of an example of sealant applied to one or more fasteners, implemented in accordance with some embodiments.

FIG. 1B illustrates side-view of an example of sealant applied to one or more fasteners, implemented in accordance with some embodiments. As shown in FIG. 1B, protrusion 110 extends away from the bulk of the material included in sealant 102. As discussed above, sealant 102 may have been applied to fasteners included in an airplane component, such as a fuel tank. Accordingly, during operation, protrusion 110 may extend into an internal cavity of the fuel tank and may be in contact with fuel stored in the fuel tank. Over time, protrusion 110 may degrade and release fragments of sealant into the fuel or may break off entirely and enter the fuel stored in the fuel tank.

Figure 1C:
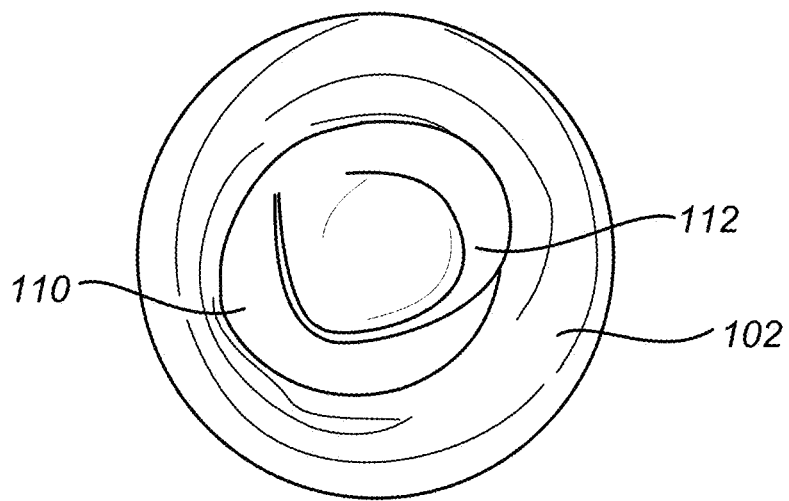
FIG. 1C illustrates top-view of an example of sealant applied to one or more fasteners, implemented in accordance with some embodiments.

FIG. 1C illustrates top-view of an example of sealant applied to one or more fasteners, implemented in accordance with some embodiments. As shown in FIG. 1C, the application of sealant 102 may result in numerous protrusions, such as protrusion 110 and additional protrusion 112. Thus, a single application of sealant to fasteners may result in numerous protrusions of sealant which may subsequently break off from the main body or bulk of the sealant. As discussed above, when installed in an internal-facing surface of a fuel tank, the protrusions may break off.

Figure 2A:
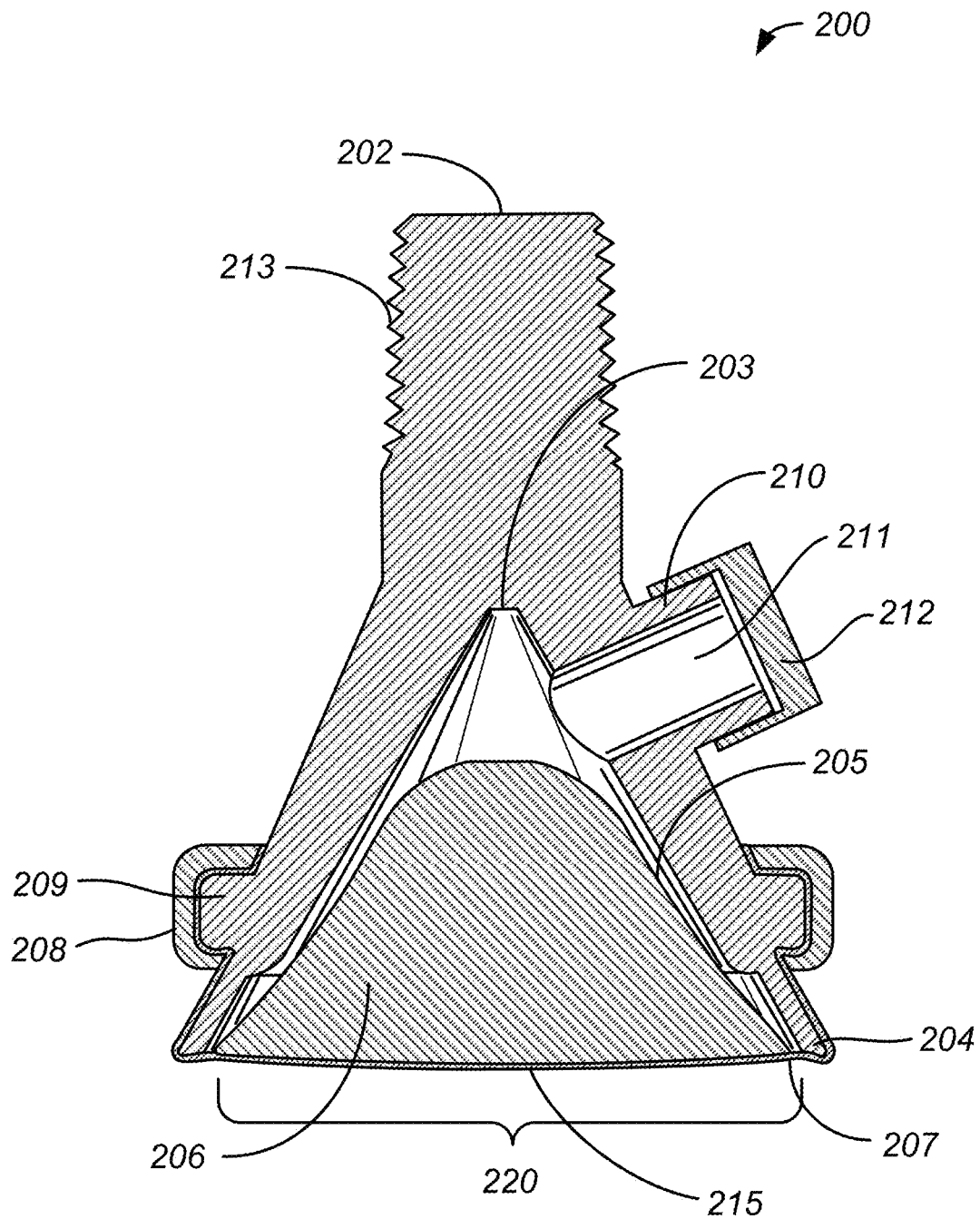
FIG. 2A illustrates a cross-section of an example of a dabbing tool, implemented in accordance with some embodiments.

FIG. 2A illustrates a cross-section of an example of a dabbing tool, implemented in accordance with some embodiments. A dabbing tool, such as dabbing tool 200, may be configured to sculpt or mold an exterior surface of sealant applied to a fastener to reduce or eliminate any protrusions that may exist on the surface of the sealant. As discussed above, during a manufacturing process, sealant may be applied to fasteners that fasten different components and panels of a vehicle, such as an airplane. The application of the sealant may result in surface imperfections. In various embodiments, dabbing tool 200 may be pressed against sealant applied to the fasteners while the sealant is pliable enough to sculpt and smooth the external surface of the sealant covering the fasteners. In various embodiments, dabbing tool 200 is configured to smooth the surface of the sealant to remove any surface imperfections.

In various embodiments, dabbing tool 200 includes housing 202 which may be configured to provide structural support for various components of dabbing tool 200, as well as provide coupling to other components of an assembly tool, as will be discussed in greater detail below. Housing 202 may include an interior opening or surface which may define a cavity or chamber, such as chamber 203. Moreover, at a first end of housing 202, portion 204 may define first opening 220 of chamber 203. As will be discussed in greater detail below, a porous member, such as porous member 205, may be included in chamber 203. In various embodiments, one or more dimensions of chamber 203 and first opening 220 defined by portion 204 may be configured based on a design specification associated with a vehicle or a component of a vehicle. For example, a vehicle, such as an airplane, may be manufactured using a designated type of fastener as well as a designated amount of sealant applied to the fastener. Accordingly, a radius or diameter of first opening 220 of chamber 203 may be configured to be just larger than a radius or diameter of the fastener when covered with sealant.

As similarly discussed above, housing 202 includes portion 213 which may be configured to be coupled to one or more other components of an assembly tool, such as a robotic sealant applicator. In some embodiments, portion 213 may be threaded such that housing 202 may be threaded and screwed onto the assembly tool. While portion 213 is shown as being threaded, numerous coupling mechanisms are contemplated and disclosed herein. For example, portion 213 may include a clamp or a clasp, nut and bolt fasteners, and/or a bonding agent.

In various embodiments, dabbing tool 200 further includes porous member 205 which may be configured to store solvent as well as release an amount of solvent when sealant applied to a fastener is to be sculpted or molded. Porous member 205 may be further configured to have an elasticity that enables a conformational change when contacting sealant applied to the fastener. For example, when in operation, dabbing tool 200 may be pressed against a sealant-covered fastener. The sealant-covered fastener may be pressed into the first chamber thus causing a conformational change in porous member 205 as porous member 205 is compressed and pushed further into chamber 203. In various embodiments, porous member 205 may be configured to, while compressed, sculpt or shape an external surface of the sealant to have a smooth surface that matches external surface 215 of porous member 205. Porous member 205 may be further configured to release an amount of stored solvent to prevent the sealant from adhering or sticking to external surface 215 of porous member 205. As will be discussed in greater detail below with reference to FIGS. 6 and 7, once the sealant has been sculpted, dabbing tool 200 may be removed from the sealant-covered fastener and porous member 205, which may have been compressed as discussed above, returns to its initial shape, as shown in FIG. 2A.

In some embodiments, porous member 205 includes first layer 206 and second layer 207. First layer 206 may be included in chamber 203 and may be configured to store an amount of liquid, which may be a solvent. First layer 206 may be further configured to release an amount of the stored liquid in response to being compressed, as may occur when dabbing tool 200 contacts a sealant-covered fastener. Furthermore, as similarly discussed above, first layer 206 may have an elasticity that enables first layer 206 to compress in response to dabbing tool 200 being pressed against a sealant-covered fastener, and return to an original position or shape in response to dabbing tool 200 being released from the sealant-covered fastener. In various embodiments, the elasticity and density of first layer 206 may be configured to provide sufficient mechanical resistance to the sealant-covered fastener when dabbing tool 200 is pressed against the sealant-covered fastener such that sufficient force is applied to the surface of the sealant covering the fastener to sculpt and smooth any protrusions that may exist on the sealant. In various embodiments, first layer 206 may include a material configured to have particular solvent absorption and release characteristics. In some embodiments, first layer 206 may include a compressed cellulose sponge material that may be configured to expand and fill chamber 203 while wet with solvent. The material can be natural or synthetic. For example, the natural compressed cellulose material may include one or more wood pulp cellulose, low density polyether, polyester.

In some embodiments, second layer 207 is positioned across first opening 220 of chamber 203 and may be configured to wick away some of the solvent stored in first layer 206, and further configured to release some of the solvent in response to dabbing tool 200 being pressed against a sealant-covered fastener. In some embodiments, second layer 207 is positioned or stretched across first opening 220 of chamber 203 and encloses first layer 206 within chamber 203. Thus, second layer 207 may be configured to provide a surface ## that interfaces with the sealant that has been applied to the fastener. In some embodiments, second layer 207 is configured to have an elasticity that enables second layer 207 to stretch and allow the sealant-covered fastener to be pressed into chamber 203. Furthermore, second layer 207 may be further configured to have an external surface ## that is substantially smooth and results in almost no surface marks or protrusions when pressed against the sealant. In some embodiments, second layer 207 may include a material that has a smoother surface than first layer 206. Furthermore, because second layer 207 may be at least partially saturated with solvent received from first layer 206, the external surface of second layer 207 may not adhere or stick to the sealant applied to the fastener. In this way, contact between second layer 207 and the sealant-covered fastener may smooth the surface of the sealant covering the fastener when the sealant is still sculptable and pliable. In various embodiments, second layer 207 may include a cotton gauze material or other wicking material.

In some embodiments, dabbing tool 200 further includes clamp 208 which may be configured to provide structural support and coupling for second layer 207. For example, second layer 207 may be stretched across first opening 220 of chamber 203, around portion 204, and over a surface feature 209 of housing 202, such as a ridge or bump. Clamp 208 may be configured to have a complementary geometry to surface feature 209, and may be configured to be clamped on top of or over surface feature 209. Accordingly, clamp 208 may be clamped over second layer 207 and surface feature 209 to secure second layer 207 in place. In some embodiments, the clamping of second layer 207 in place may also secure first layer 206 within chamber 203 by virtue of the mechanical coupling between first layer 206 and second layer 207.

Dabbing tool 200 further includes port 210 which may be configured to receive an amount of solvent from an external solvent reservoir. Accordingly, port 210 may be configured to be threaded with or clamped to the external solvent reservoir itself, or a pipe or hose that may be used to couple port 210 with the external solvent reservoir. In this way, a steady supply of solvent may be provided to port 210 throughout an assembly process. In some embodiments, port 210 may be implemented as part of housing 202. Accordingly, port 210 may be integrated with housing 202 as a surface feature of housing 202. In some embodiments, port 210 may be implemented as a separate component or components of dabbing tool 200. Accordingly, port 210 may be a part or portion of an assembly that enables the transfer of solvent from an external solvent reservoir to dabbing tool 200.

In various embodiments, housing 202 may further include second opening 211 which may be coupled with chamber 203 and may extend through port 210. Accordingly, solvent received at port 210 may travel through second opening 211 and enter chamber 203. In this way, solvent received from the external solvent reservoir may be transferred to chamber 203 and porous member 205 included within chamber 203. Dabbing tool 200 may also include cap 212 which may be configured to cover port 210 and second opening 211 when an external solvent reservoir is not coupled to dabbing tool 200.

Figure 2B:
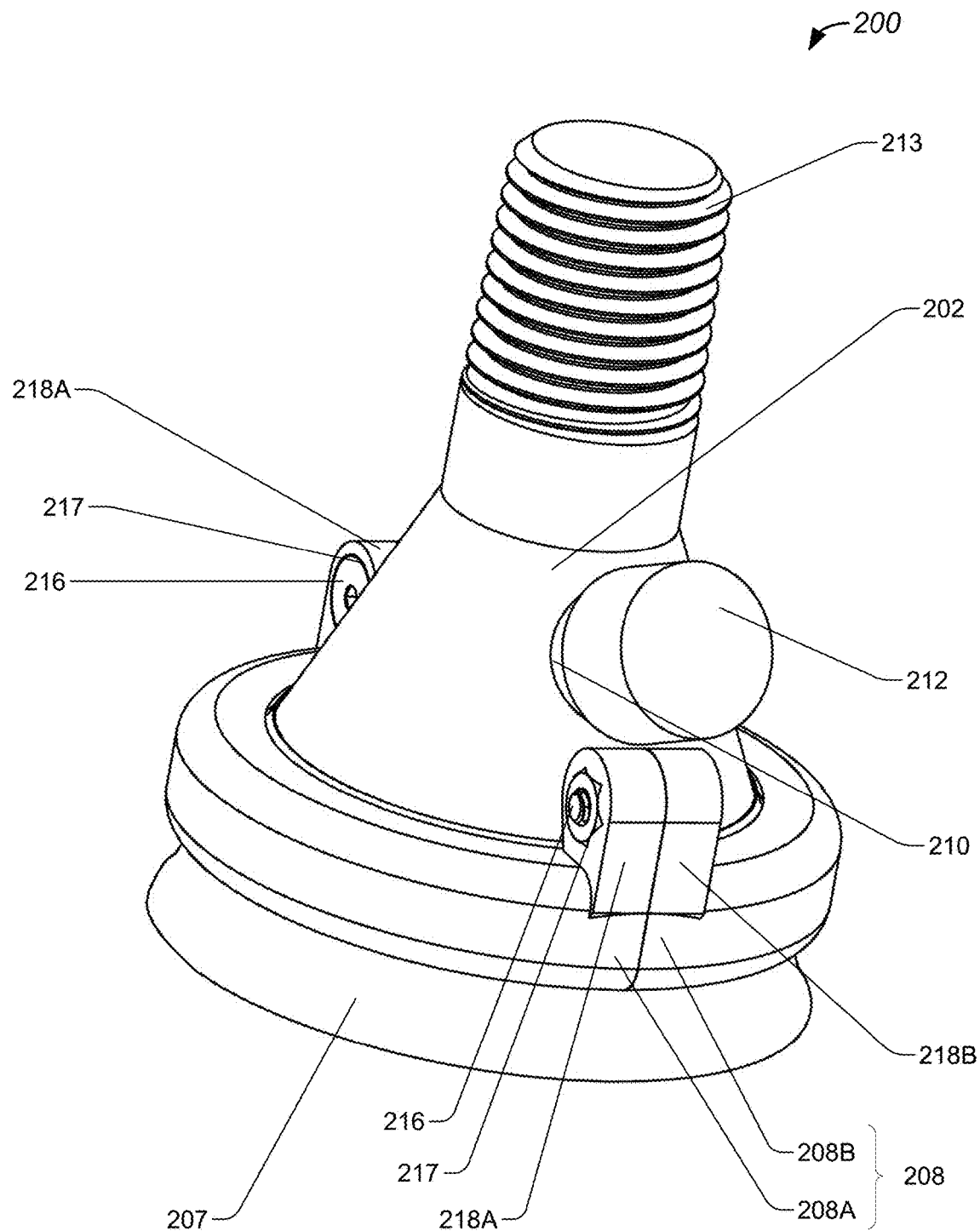
FIG. 2B illustrates a side-view of an example of a dabbing tool, implemented in accordance with some embodiments.

FIG. 2B illustrates a side-view of an example of a dabbing tool, implemented in accordance with some embodiments. As discussed above with reference to FIG. 2A, a dabbing tool, such as dabbing tool 200, may be configured to sculpt or mold an exterior surface of sealant applied to a fastener to eliminate any protrusions that may exist on the surface of the sealant. FIG. 2B illustrates an exterior view of dabbing tool 200. Accordingly, dabbing tool 200 includes housing 202 and second layer 207, which may be associated with porous member 205 discussed above. Dabbing tool 200 further includes clamp 208 that may be configured to secure second layer 207 in place. Moreover, dabbing tool 200 also includes cap 212, which may be associated with port 210 discussed above. Dabbing tool 200 also includes portion 213 which may be configured to be coupled to one or more other components of an assembly tool, such as a robotic sealant applicator. As shown in FIG. 2B, second layer 207 may form an external layer or surface of porous member 205 and may enclose first layer 206 within chamber 203 discussed above. Accordingly, second layer 207 may contact sealant-covered fasteners during the operation of dabbing tool 200. In various embodiments, clamp 208 includes two clamp parts 208A and 208B, which may be releasably fixed to each other by fixation members 216. In some embodiments, fixation members 216 may be received in openings 217 in lugs 218A and 218B. Although FIG. 2B illustrates clamp 208 in a position where lugs 218A and 218B are aligned with port 210 and cap 212, clamp 208 may be clamped onto surface feature 209 with the lugs 218A and 218B in any desired position.

Figure 2C:
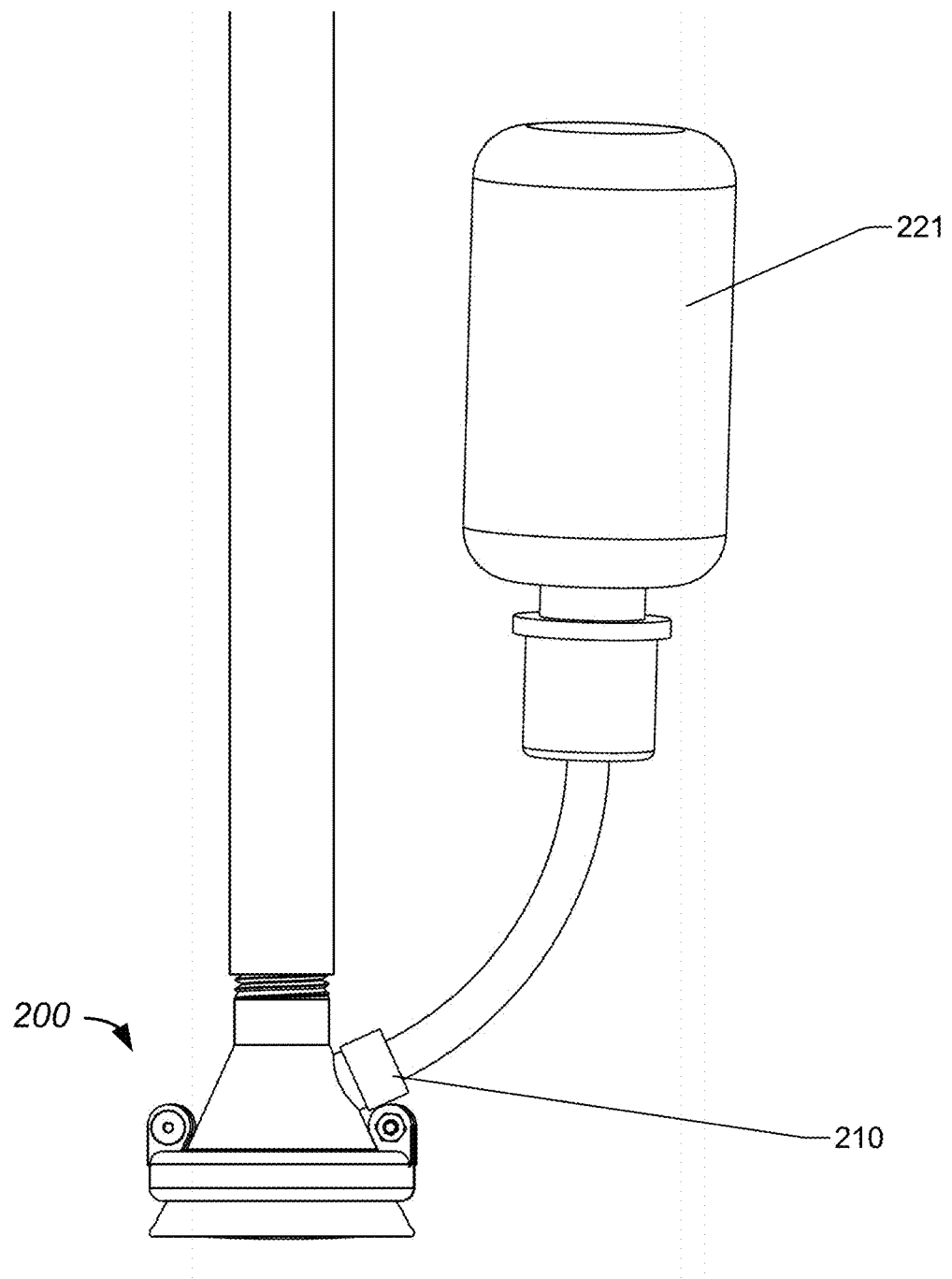
FIG. 2C illustrates a side-view of an example of a dabbing tool coupled to a reservoir, implemented in accordance with some embodiments.

FIG. 2C illustrates a side-view of an example of a dabbing tool coupled to a reservoir, implemented in accordance with some embodiments. As discussed above, a dabbing tool, such as dabbing tool 200 is coupled to a reservoir of solvent, such as reservoir 221. Thus, according to some embodiments, reservoir 221 is an external reservoir that is coupled to dabbing tool 200 via port 210, and is configured to provide solvent stored within an external reservoir 221 to one or more internal components of dabbing tool 200, such as porous member 205 discussed above. In this way, an external supply of solvent may be provided to dabbing tool 200 via port 210 and second opening 211.

Figure 3:
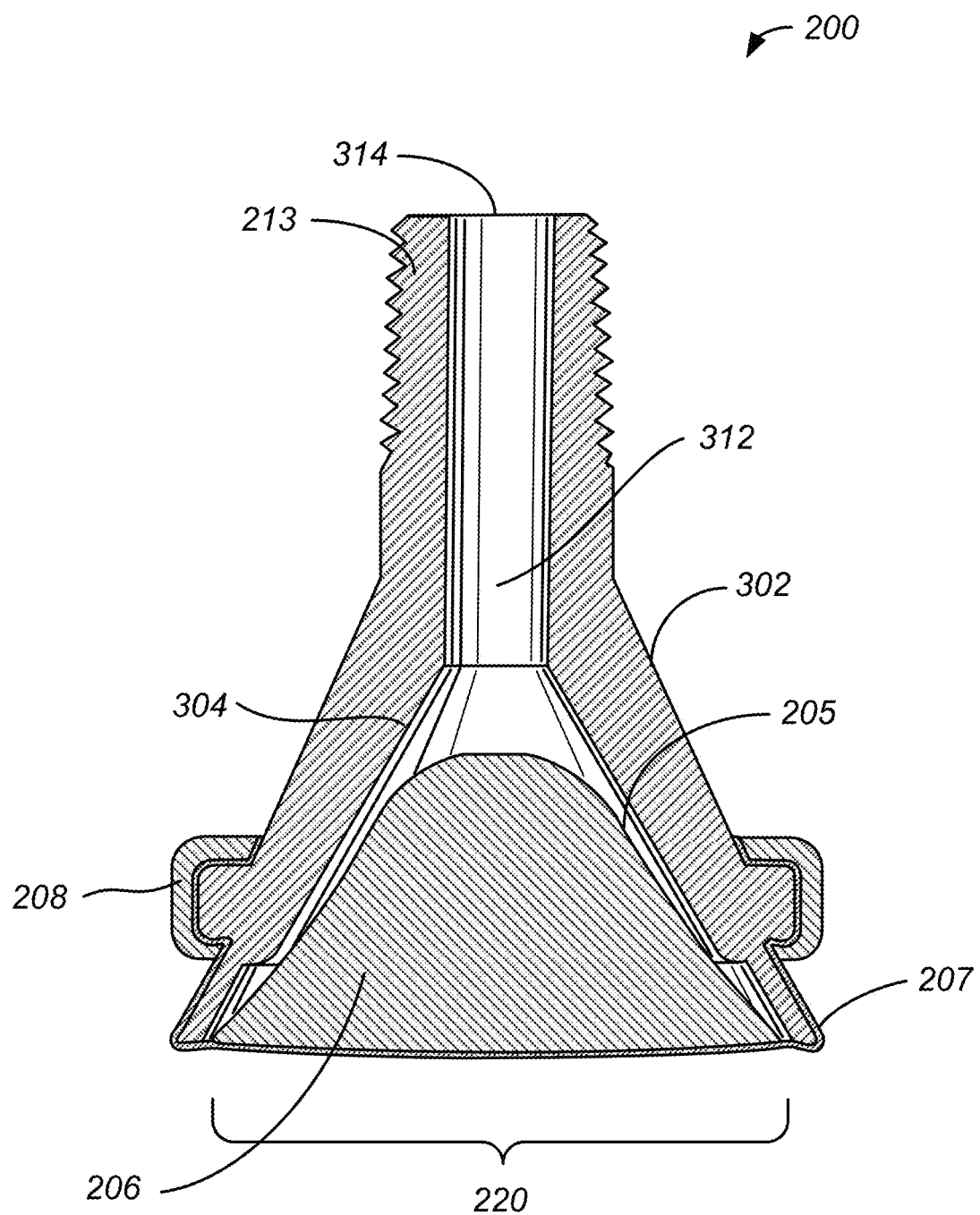
FIG. 3 illustrates a cross-section of another example of a dabbing tool, implemented in accordance with some embodiments.

FIG. 3 illustrates a cross-section of another example of a dabbing tool, implemented in accordance with some embodiments. As similarly discussed above, a dabbing tool, such as dabbing tool 200 is configured to sculpt or mold an exterior surface of sealant applied to a fastener to reduce or eliminate any protrusions that may exist on the surface of the sealant. In some embodiments, one or more components of dabbing tool 200 are configured such that dabbing tool 200 is coupled with an internal solvent reservoir and not an external solvent reservoir. For example, housing 302 and chamber 304 are configured to accommodate internal flow path 312 of solvent, as will be discussed in greater detail below. Accordingly, dabbing tool 200 includes housing 302, which further includes chamber 303 and first opening 220 of housing 302. In some embodiments, dabbing tool 300 further includes porous member 205, which may be positioned inside chamber 303 having a first opening. Porous member 205 includes first layer 206 and second layer 207. Dabbing tool 200 further includes clamp 208 that is configured to secure second layer 207 in place across first opening 220. In some embodiments, dabbing tool 200 is configured to receive solvent via an internal flow path, such as flow path 312. Thus, flow path 312 may be an internal tube or pipe that may be coupled to chamber 304, may extend along the body of housing 302, and may terminate at second opening 314.

As similarly discussed above, portion 213 of housing 302 may be configured to be coupled to one or more other components of a sealant application apparatus or system. Thus, according to some embodiments, in addition to mechanically coupling to other components of the sealant application system via portion 213, dabbing tool 200 may also couple flow path 312 to a flow path or system of the sealant application system. In this way, dabbing tool 200 may receive solvent from other components of the sealant application system via second opening 314 and flow path 312, which may be provided to porous member 205 included in chamber 304. When configured in this way, dabbing tool 300 might not include an additional port and external reservoir of solvent.

Figure 4:
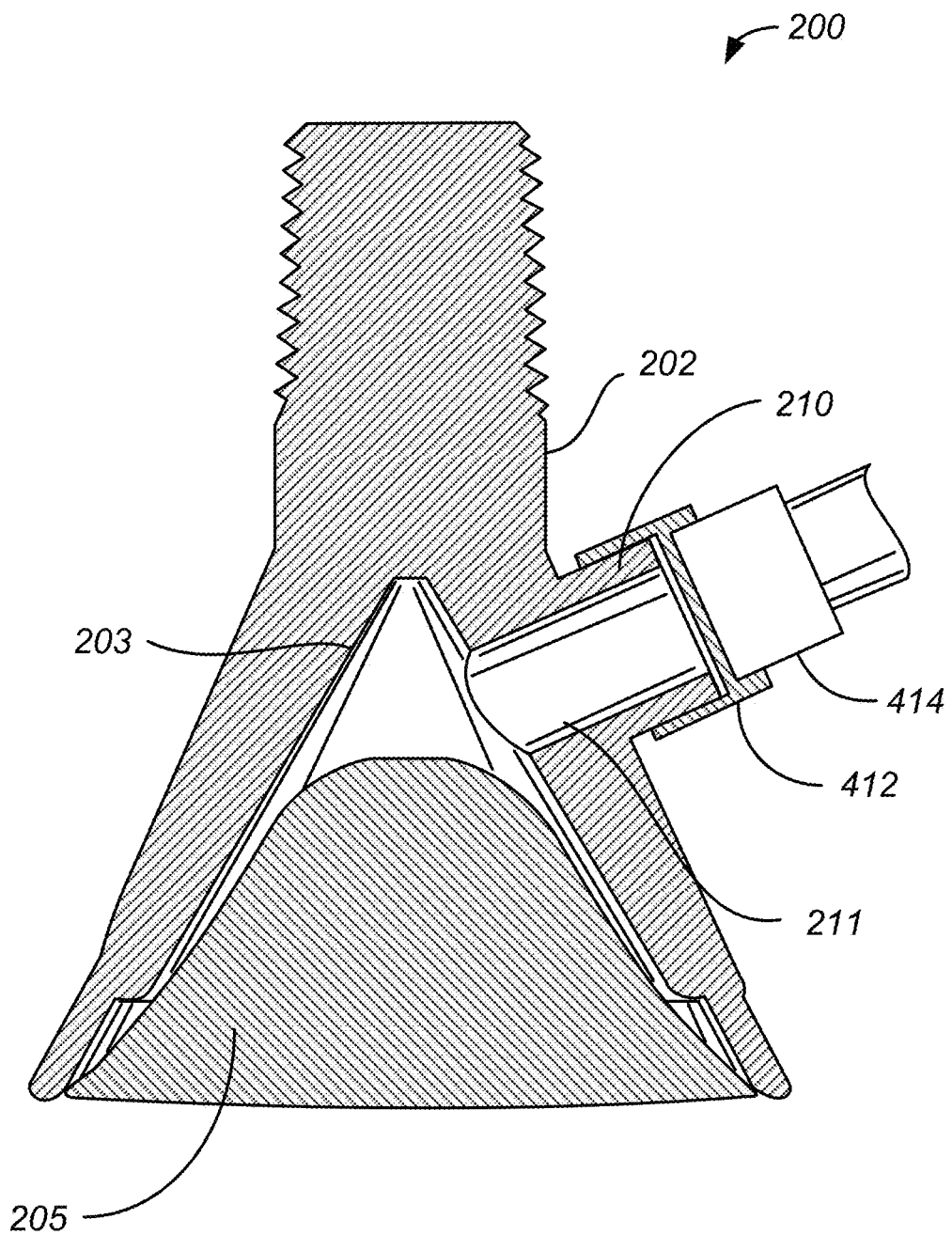
FIG. 4 illustrates a cross-section of yet another example of a dabbing tool, implemented in accordance with some embodiments.

FIG. 4 illustrates a cross-section of yet another example of a dabbing tool, implemented in accordance with some embodiments. As similarly discussed above, a dabbing tool, such as dabbing tool 200 is configured to sculpt or mold an exterior surface of sealant applied to a fastener to reduce any protrusions that may exist on the surface of the sealant. As will be discussed in greater detail below, dabbing tool 200 may be implemented with no second layer 207, and instead may include regulator 414. Accordingly, dabbing tool 200 includes housing 202, which includes chamber 203. In some embodiments, chamber 203 includes porous member 205.

As shown in FIG. 4, porous member 205 might include a single layer, and might not include two layers, such as first layer 206 and second layer 207 discussed above. When configured in this way, the single layer of porous member 205 is configured to store an amount of solvent, release at least a portion of the amount of solvent in response to being compressed by contact with a sealant-covered fastener, and sculpt or shape a surface of the sealant covering the fastener. Accordingly, dabbing tool 200 might not include second layer 207, or clamp 208 to hold second layer 207 in place. In various embodiments, porous member 205 is mechanically coupled or chemically bonded to an internal surface of chamber 203. For example, porous member 205 may be chemically bonded to chamber 203 via a chemical adhesive.

As shown in FIG. 4, dabbing tool 200 further includes port 210 and opening 211 which may be configured to transfer solvent from an external reservoir to chamber 203. Dabbing tool 200 further includes regulator 414 and coupler 412, which may be configured to provide mechanical coupling between regulator 414 and opening 211. In some embodiments, regulator 414 may be configured to regulate a flow of solvent from an external reservoir, which may be coupled to regulator 414, to opening 211 and chamber 203. Accordingly, regulator 414 may be configured to control the flow of solvent from the external reservoir to porous member 205 such that porous member 205 has sufficient solvent to reduce or prevent adhesion with sealant applied to a fastener, but is not over-saturated and shedding excess solvent. As discussed herein, dabbing tool 200 may optionally include regulator 414. Thus, according to some embodiments, dabbing tool 200 might not include regulator 414, and an external reservoir may be coupled directly with port 210. In various embodiments, regulator 414 may be an elector-mechanical valve that may be configured to allow a designated amount of solvent to be transferred from a pressurized external reservoir to dabbing tool 200 when actuated. In some embodiments, regulator 414 is a mechanical choke.

Figure 5A:
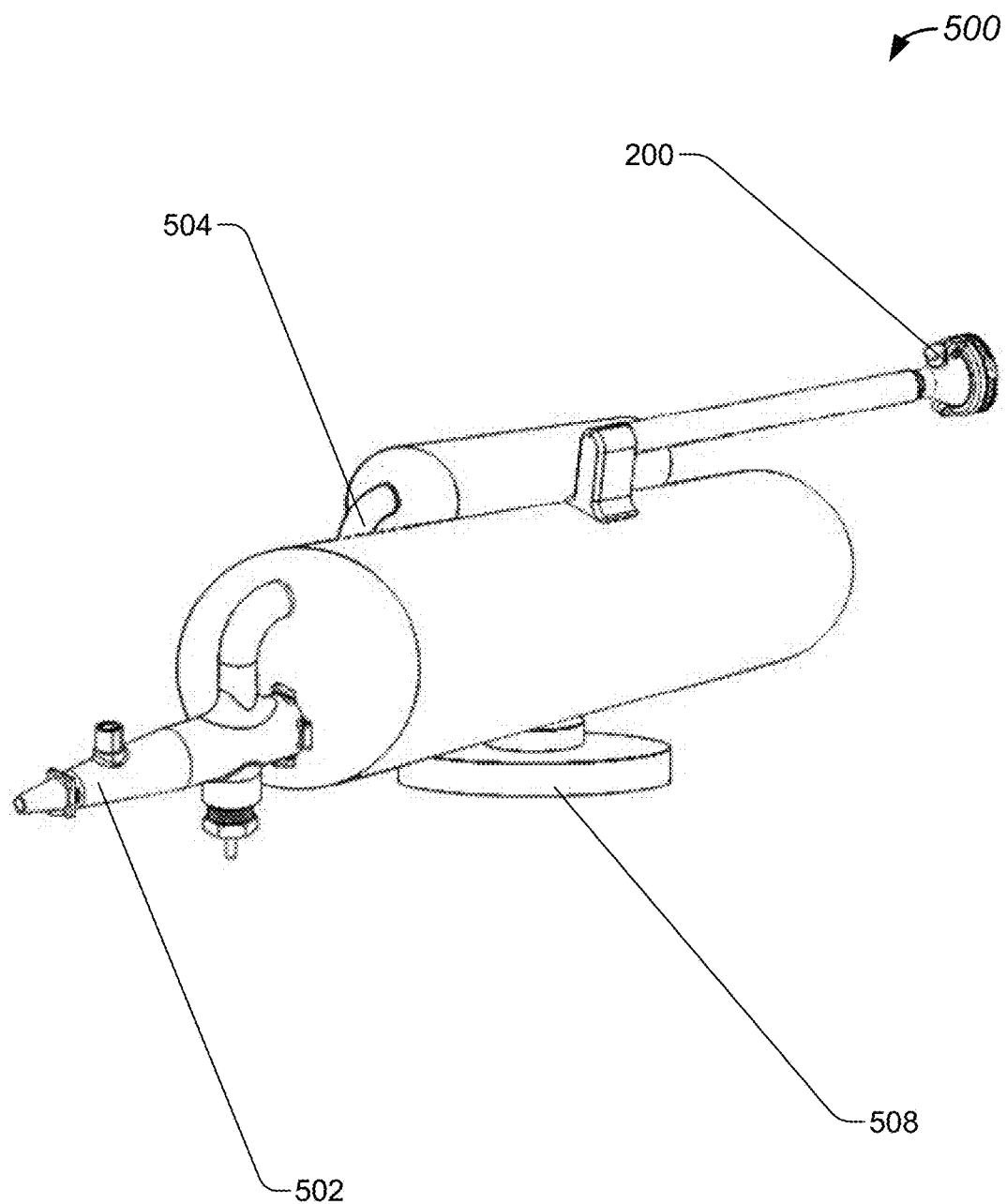
FIG. 5A illustrates an example of a system for applying sealant to a fastener, implemented in accordance with some embodiments.

FIG. 5A illustrates an example of a system for applying sealant to a fastener, implemented in accordance with some embodiments. System 500 may be implemented with any of the above-described embodiments, and dabbing tool 200 is described for convenience only. System 500 includes one or more components configured to apply sealant to fasteners by using complete or partial automation. As discussed above, the fasteners are used to fasten different components of a vehicle or machine. Accordingly, system 500 may be mounted on or coupled with a robotic arm that may be configured to move system 500 among a plurality of designated positions corresponding to fasteners in an interface between components of a vehicle, such as an airplane. In some embodiments, the plurality of designated positions may be determined or identified based on a computer-assisted design (CAD) model and engineering data that characterizes the CAD model. For example, a CAD model may have been previously generated by one or more designers of an airplane. The CAD model may identify, in three-dimensional space, the location of each of the fasteners included in the airplane. Accordingly, system 500 may be mounted on a robotic arm configured to register its own location to a reference point and move system 500 along a path of fasteners defined by the engineering data. Accordingly, movement of the robotic arm may be determined based on a fastener type and a location of a sealant surface feature.

In various embodiments, at each position, sealant may first be applied via a nozzle of sealant applicator 502 which may be coupled to a sealant reservoir via tubes 504. Accordingly, system 500 is configured to apply a designated amount of sealant for each fastener included in the path that system 500 is currently navigating. In some embodiments, the amount of sealant may be selected based on the type of fastener being sealed. Once the sealant has been applied, a component of system 500, such as a rotating component (rotator 508) may be configured to rotate the position of system 500 relative to the fastener that was just sealed. In some embodiments, system 500 may be rotated about 180 degrees such that dabbing tool 200 faces the fastener that was just sealed. Once rotated, the robotic arm may position or move system 500 such that dabbing tool 200 is pressed against the sealant-covered fastener and reduces or eliminates any protrusions from the surface of the sealant covering the fastener. System 500 may be configured to repeat these operations for any number of fasteners included in an interface between two components of the vehicle or machine that is being assembled.

Figure 5B:
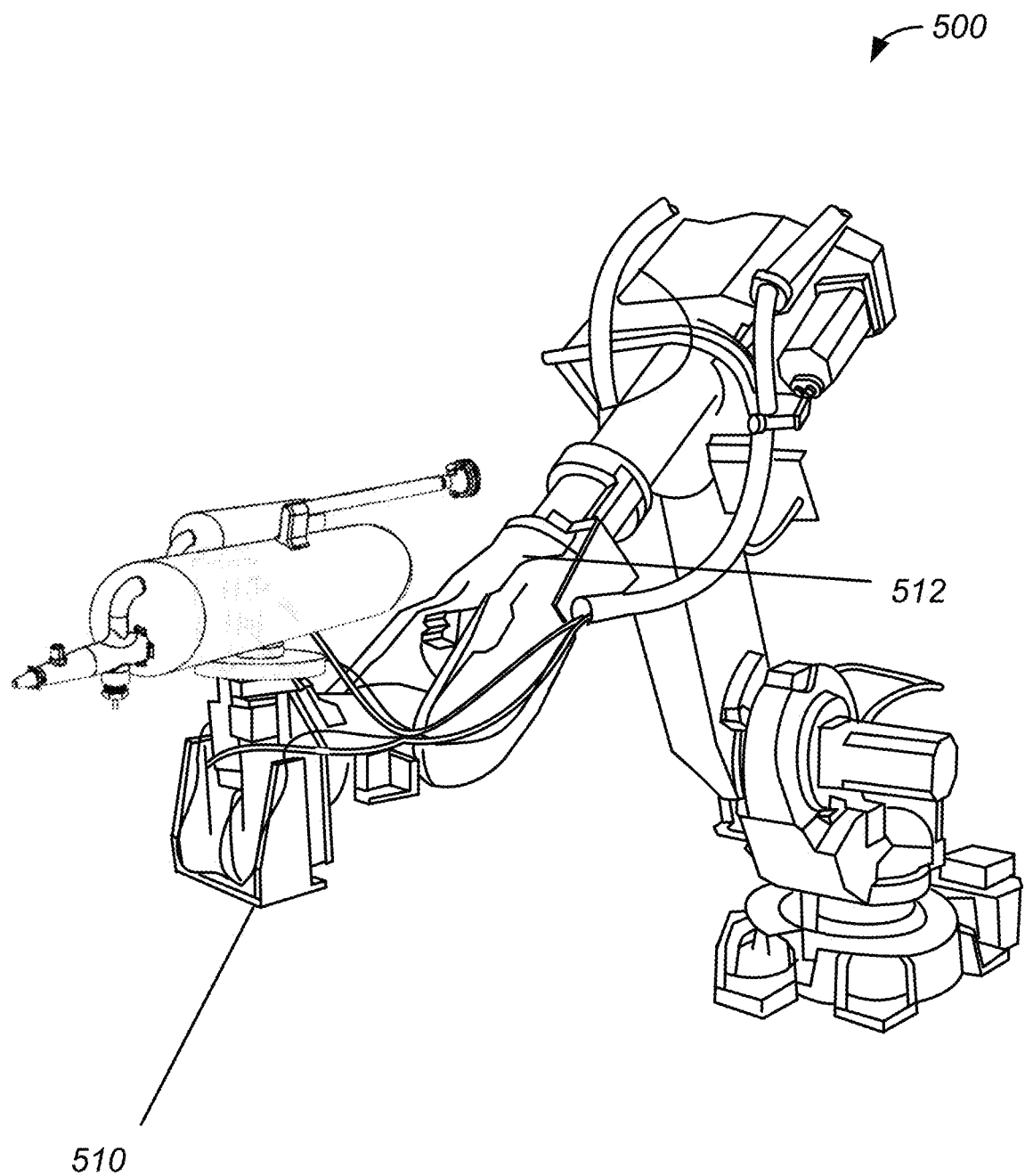
FIG. 5B illustrates an example of another system for applying sealant to a fastener, implemented in accordance with some embodiments.

FIG. 5B illustrates another example of a system for applying sealant to a fastener, implemented in accordance with some embodiments. As discussed above with reference to FIG. 5A, dabbing tool 200, sealant applicator 502, and rotator 508 are coupled with robotic arm 512 via end effector 510. As will be discussed in greater detail below, end effector 510 and robotic arm 512 are automatically controlled to position dabbing tool 200 to perform one or more dabbing operations to reduce protrusions 110 from a surface of sealant applied to a fastener. In various embodiments, the movement of end effector 510 and robotic arm 512 may be controlled by engineering data and/or metrology data. As discussed in greater detail below, engineering data may characterize a three-dimensional representation of a component or assembly of a machine which may be a vehicle. Moreover, metrology data may characterize a position of dabbing tool 200 with respect to the component. Accordingly, system 500 may utilize both the engineering data and the metrology data to move dabbing tool 200 to various different fasteners of a particular component, and perform one or more dabbing operations on each fastener.

Figure 6:
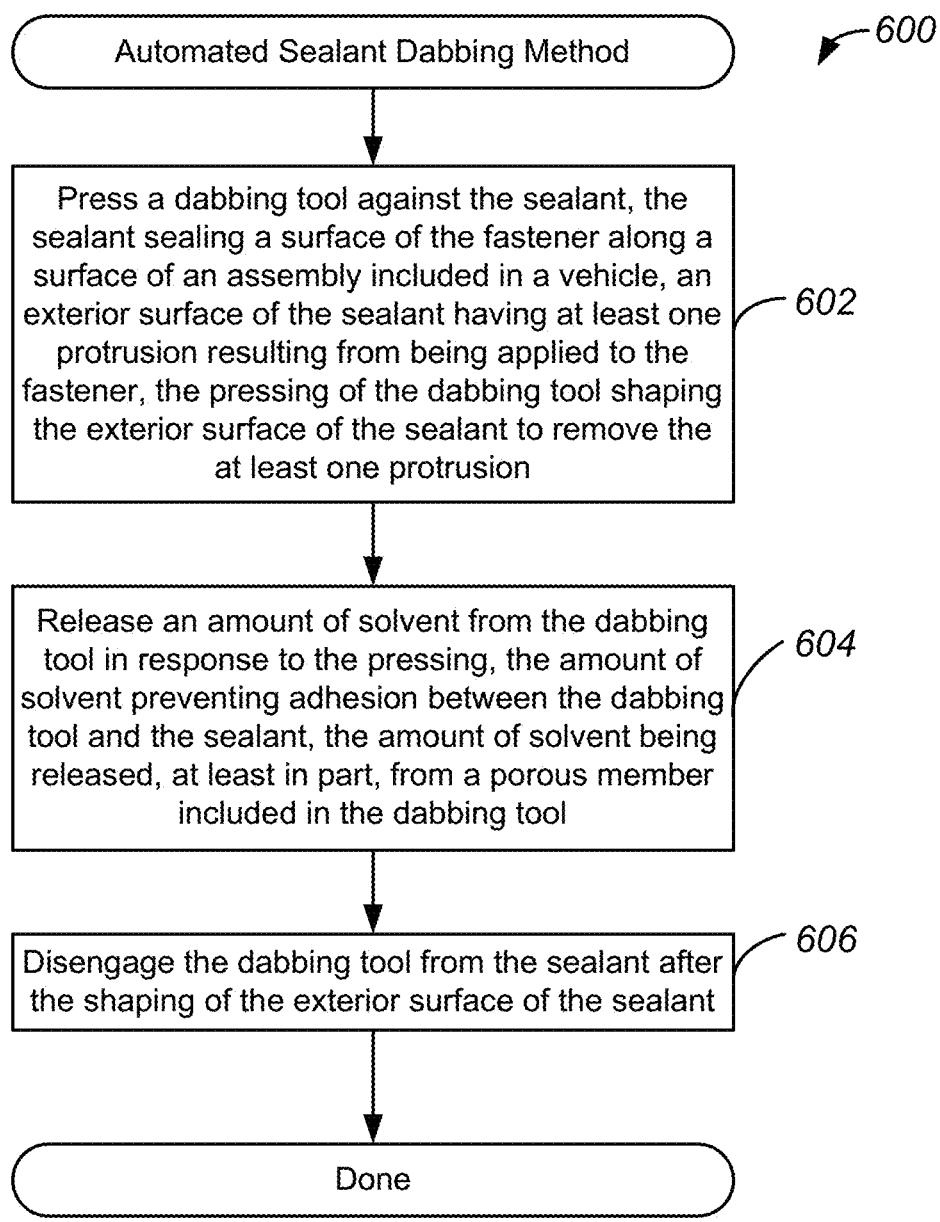
FIG. 6 illustrates a flow chart of an example of a method for automated sealant dabbing, implemented in accordance with some embodiments.

FIG. 6 illustrates a flow chart of an example of a method for automated sealant dabbing, implemented in accordance with some embodiments. As similarly discussed above, method 600 may be implemented with any of the above-described embodiments, and dabbing tool 200 is described for convenience only. Accordingly, dabbing tool 200 and system 500 may be used in conjunction with a robotic sealant applicator to seal fasteners used to fasten different components of a vehicle together. As will be discussed in greater detail below, the robotic sealant applicator, such as sealant applicator 502 may first apply sealant to the fastener after the fastener has been coupled to the components. However, the sealant that has been applied may have surface imperfections, such as protrusions. Accordingly, a dabbing tool, such as dabbing tool 200 as disclosed herein, may be used to mold or sculpt an exterior surface of the sealant to remove substantially all of the surface imperfections.

Accordingly, method 600 may commence with operation 602 during which dabbing tool 200 is pressed against sealant that has been applied to the fastener. As discussed above, the sealant may seal a surface of the fastener along a surface of an assembly included in a machine. Furthermore, exterior surface 103 of the sealant may have at least one protrusion 110 or surface imperfection that may result from the application of the sealant to the fastener. In various embodiments, the pressing of dabbing tool 200 against the sealant during operation 602 shapes exterior surface 103 of the sealant to smooth the protrusions and surface imperfection, thus removing the at least one protrusion. As similarly discussed above with reference to FIG. 2A, the dimensions and features of components of dabbing tool 200 may be configured to precisely contour exterior surface 103 of the sealant based on a design specification associated with the fastener to which the sealant has been applied.

Method 600 may proceed to operation 604 during which an amount of solvent is released from dabbing tool 200 in response to the pressing of dabbing tool 200 against the sealant. In various embodiments, the amount of solvent reduces or prevents adhesion between dabbing tool 200 and the sealant. As previously discussed, the solvent may be a solvent such as isopropyl alcohol. Furthermore, the amount of solvent may be released, at least in part, from porous member 205 included in dabbing tool 200. Accordingly, in response to dabbing tool 200 being pressed against the sealant-covered fastener and porous member 205 being compressed, an amount of solvent may be released to ensure that coupling between the sealant and one or more surfaces of the dabbing tool is reduced.

Method 600 may proceed to operation 606 during which dabbing tool 200 is disengaged from the sealant applied to the fastener. In some embodiments, dabbing tool 200 may be disengaged after the shaping of exterior surface 103 of the sealant. Accordingly, once the sealant has been sculpted or molded to remove or eliminate any protrusions, dabbing tool 200 may be disengaged and moved to another position. In some embodiments, another sealant-covered fastener may be located at the other position, and method 600 may repeat until all sealant-covered fasteners in the vehicle assembly have been sculpted by dabbing tool 200.

Figure 7:
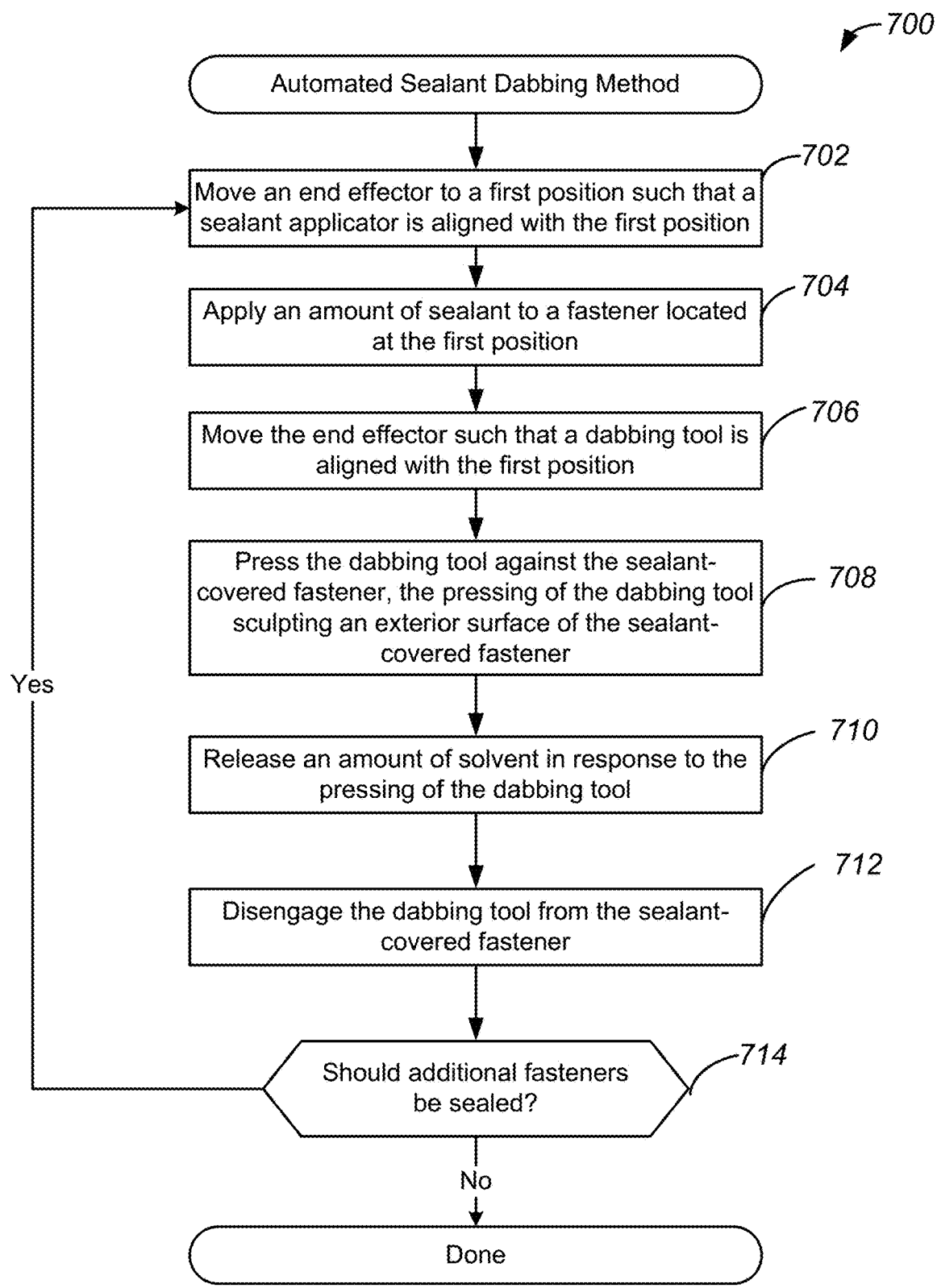
FIG. 7 illustrates a flow chart of an example of another method for automated sealant dabbing, implemented in accordance with some embodiments.

FIG. 7 illustrates a flow chart of an example of another method for automated sealant dabbing, implemented in accordance with some embodiments. As similarly discussed above, method 700 may be implemented with any of the above-described embodiments, and dabbing tools 200 is described for convenience only. Accordingly, dabbing tool 200 may be used in conjunction with a robotic sealant applicator to seal fasteners used to fasten different components of a machine together. As will be discussed in greater detail below, the robotic sealant applicator may first apply sealant to the fastener after the fastener has been coupled to the components. Moreover, dabbing tool 200 may be used to remove any surface imperfections from the applied sealant. Such automated application of sealant to fasteners may be performed for numerous different fasteners included in numerous different interfaces or seams between components of a machine, such as an aircraft. In this way, a robot may be configured to progress through all fasteners to be sealed based on available engineering and metrology data, thus enabling the automated robotic sealing of fasteners installed in a vehicle.

Accordingly, method 700 may commence with operation 702 during which end effector 510 is moved to a first position. In various embodiments, end effector 510 may be coupled to robotic arm 512 that may be implemented as part of a robotic assembly process. End effector 510 may be coupled to and provide structural support for sealant applicator 502 and dabbing tool 200, as similarly discussed above with reference to FIG. 5. Accordingly, during operation 702, end effector 510 may be moved to a first position that may be associated with a first fastener to be sealed. In some embodiments, the first fastener may be one of several fasteners that have been used to join or fasten two components of a machine, such as an airplane, together. The fasteners may have been installed as part of a previous operation during an assembly process. Accordingly, all fasteners may have been previously installed, and method 700 may be implemented as part of a subsequent sealing method. In various embodiments, when moved to the first position, end effector 510 may be oriented such that sealant applicator 502 coupled with end effector 510 is aligned with the first position and the fastener installed at the first position. When aligned, end effector 510 may be configured to apply sealant to the fastener. In various embodiments, the location of the first position and the positioning of end effector 510 relative to the first position may be controlled and determined based on previously generated engineering data, as discussed above, as well as available metrology data that characterizes the position and location of end effector 510 as well as the robot coupled to end effector 510.

Method 700 may proceed to operation 704 during which sealant applicator 502 applies an amount of sealant to the fastener located at the first position. Accordingly, when positioned and aligned at the first position, sealant applicator 502 may be configured to apply a designated amount of sealant to the fastener. The applied sealant may cover an exposed portion of the fastener and form a seal between the fastener and a surface of the component in which the fastener is installed. For example, the fastener may be installed in seam or interface of a fuel tank. Once installed, a portion of the fastener may extend into the interior of the fuel tank. In the exemplary embodiment, the sealant applied during operation 704 may cover the exposed portion of the fastener and seal any gaps or spaces between the fastener and a component of an assembly, such as an interior surface of the fuel tank. As similarly discussed above, after application of the sealant, a surface of the sealant may have surface imperfections and protrusions.

Method 700 may proceed to operation 706 during which end effector 510 is moved such that dabbing tool 200 is aligned with the first position. In various embodiments, sealant applicator 502 and dabbing tool 200 may both be coupled to end effector 510, but in different positions or orientations, as similarly discussed above with reference to FIG. 5. Accordingly, the position of end effector 510 may be moved or rotated such that dabbing tool 200 is aligned with the first position. As similarly discussed above, the positioning of end effector 510 and dabbing tool 200 may be controlled and determined based on engineering data and metrology data.

Method 700 may proceed to operation 708 during which dabbing tool 200 is pressed against the sealant-covered fastener. As discussed above, the pressing of dabbing tool 200 may sculpt the exterior surface of the sealant covering the fastener. Accordingly, an end effector may press dabbing tool 200 to a predetermined height from the top of the fastener thus pressing of dabbing tool 200 against the sealant during operation 708 and shaping the exterior surface of the sealant to smooth the protrusions and surface imperfection. In this way, substantially all protrusions and surface imperfections may be reduced. As similarly discussed above, the dimensions and features of components of dabbing tool 200 may be configured to precisely contour the external surface of the sealant based on a design specification associated with the fastener to which the sealant has been applied. For example, the geometry of housing 202 and porous member 205 of a dabbing tool, such as dabbing tools 200 and 200, as well as the elasticity of porous member 205 may be configured to impart a specific shape or geometry on the sealant, where the specific shape or geometry complies with one or more design specifications associated with the fastener that is being sealed which may specify that an exterior surface of the sealant be smooth and have no sharp corners or dents. Furthermore, an amount of force applied by end effector 510 when pressing dabbing tool 200 may also be configured to impart a specific shape or geometry on the sealant.

Method 700 may proceed to operation 710 during which an amount of solvent is released in response to the pressing of dabbing tool 200. As similarly discussed above, the amount of solvent may prevent adhesion between dabbing tool 200 and the sealant, thus enabling the subsequent disengaging of dabbing tool 200 discussed in greater detail below, and further enabling the surface of the sealant to maintain the shape or configuration imparted by dabbing tool 200. In various embodiments, the amount of solvent may be released, at least in part, from porous member 205 included in dabbing tools 200 and 200. Accordingly, in response to dabbing tool 200 being pressed against the sealant-covered fastener and porous member 205 being compressed, an amount of solvent stored in porous member 205 may be released to ensure that coupling between the sealant and one or more surfaces of dabbing tool 200 is reduced.

Method 700 may proceed to operation 712 during which dabbing tool 200 is disengaged from the sealant-covered fastener. As similarly discussed above, dabbing tool 200 may be disengaged after the shaping of the exterior surface of the sealant. Accordingly, once the sealant has been sculpted or molded to reduce or eliminate any protrusions, dabbing tool 200 may be disengaged. In various embodiments, once dabbing tool 200 has been disengaged, porous member 205 may no longer be compressed and may return to its original or resting shape or configuration. Moreover, when returning to its original configuration, porous member 205 may replenish the amount of solvent that was released. For example, porous member 205 may receive an additional amount of solvent from an external reservoir of solvent, thus enabling the release of solvent in additional subsequent dabbing operations that may occur.

Method 700 may proceed to operation 714 during which it is determined whether or not additional fasteners should be sealed. In various embodiments, such a determination may be made based on engineering data and available metrology data. For example, one or more paths may have been determined based on engineering data associated with the parts or components being joined. Each path may identify or characterize one or more fasteners that have been installed along an interface between the components. The robot coupled with sealant applicator 502 and dabbing tool 200 may be configured to progress among different fasteners included in a particular path. Accordingly, a controller associated with the robot may be configured to operate as a state machine that steps through different fasteners included in a path, and different paths associated with the vehicle or assembly. In this way, the controller may determine if additional fasteners exist within the current path of the robot, as well as whether or not additional paths exist. If it is determined that additional fasteners should be sealed, method 700 may return to operation 702 and additional iterations of method 700 may be performed for other fasteners installed at other positions. If it is determined that no additional fasteners should be sealed, method 700 may terminate.

Figure 8:
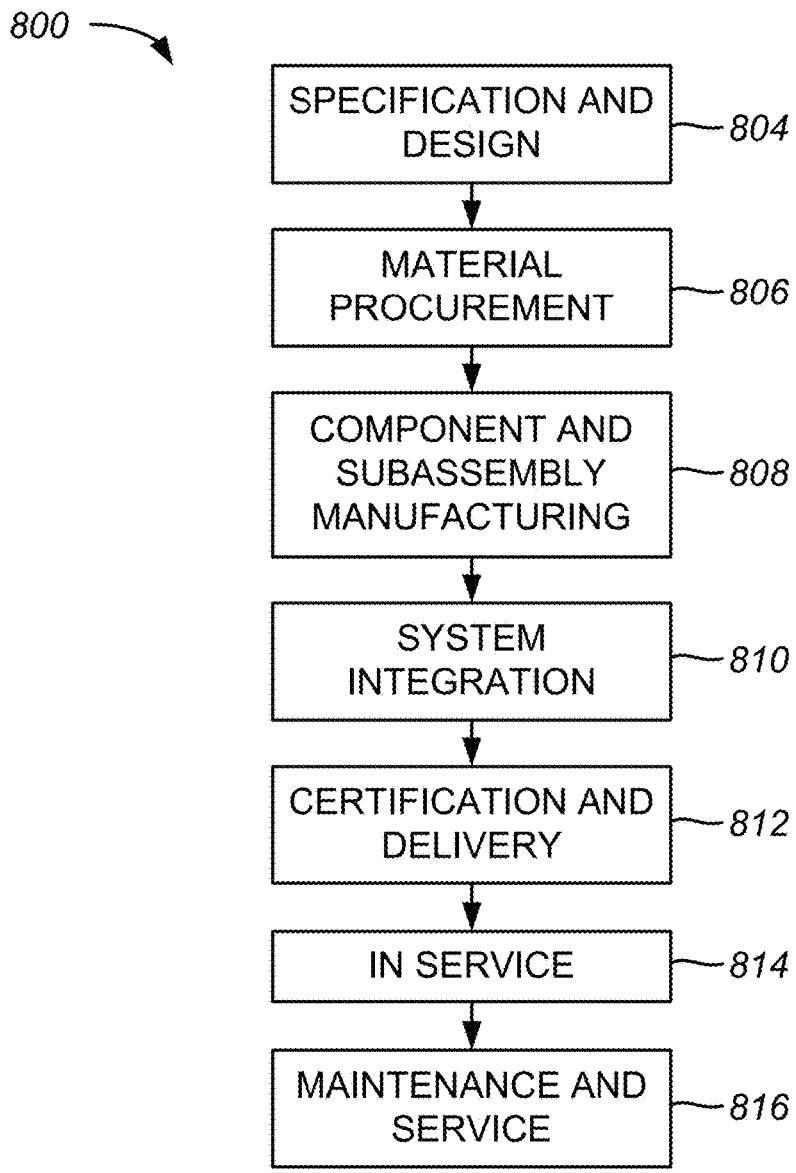
FIG. 8 illustrates a flow chart of an example of an aircraft production and service methodology, implemented in accordance with some embodiments.
Figure 9:
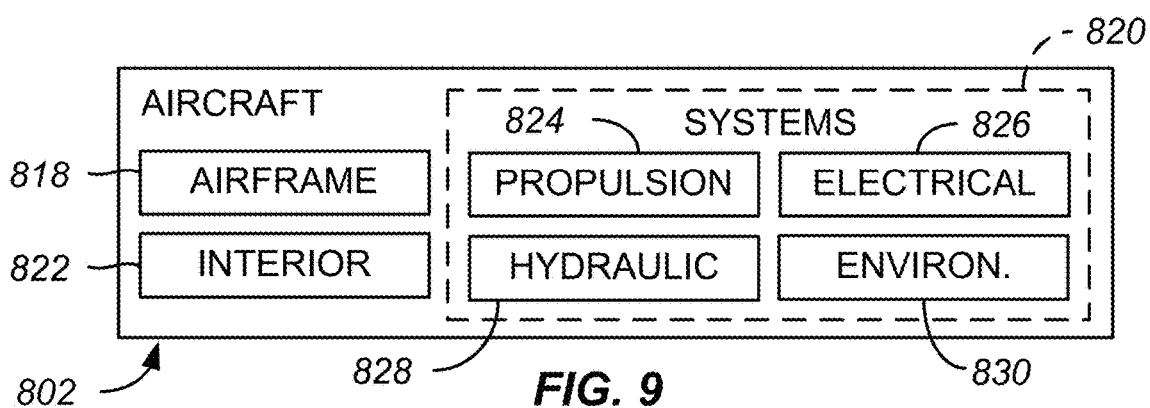
FIG. 9 illustrates a block diagram of an example of an aircraft, implemented in accordance with some embodiments.

As disclosed above, sealant may be applied to fasteners and dabbing tools, such as dabbing tool 200 may be implemented to reduce surface protrusions 110 of the applied sealant. As discussed in greater detail below, the application of such sealant and use of dabbing tool 200 may occur during the manufacture of a machine which may be a vehicle such as an aircraft. Accordingly, embodiments of the disclosure may be described in the context of an aircraft manufacturing and service method 800 as shown in FIG. 8 and an aircraft 802 as shown in FIG. 9. During pre-production, illustrative service method 800 may include specification and design 804 of the aircraft 802 and material procurement 806. During production, component and subassembly manufacturing 808 and system integration 810 of the aircraft 802 takes place. Thereafter, the aircraft 802 may go through certification and delivery 812 in order to be placed in service 814. While in service by a customer, the aircraft 802 is scheduled for routine maintenance and service 816 (which may also include modification, reconfiguration, refurbishment, and so on).

Each of the processes of service method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 9, the aircraft 802 produced by illustrative method 800 may include an airframe 818 with a plurality of systems 820 and an interior 822. Examples of high-level systems 820 include one or more of a propulsion system 824, an electrical system 826, a hydraulic system 828, and an environmental system 830. Any number of other systems may be included. Although an aerospace example is shown, the principles of the invention may be applied to other industries, such as the automotive industry.

Apparatus and methods embodied herein may be employed during any one or more of the stages of the production and service method 800. For example, components or subassemblies corresponding to production operation 808 may be fabricated or manufactured in a manner similar to components or subassemblies produced while the aircraft 802 is in service. Also, one or more apparatus embodiments, method embodiments, or a combination thereof may be utilized during the production operations 808 and 810, for example, by substantially expediting assembly of or reducing the cost of an aircraft 802. Similarly, one or more of apparatus embodiments, method embodiments, or a combination thereof may be utilized while the aircraft 802 is in service, for example and without limitation, to maintenance and service 816.

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. A method for shaping sealant applied to a fastener, the method comprising:
   storing a first amount of solvent in a first layer of a porous member of a dabbing tool;
   storing a second amount of solvent in a second layer of the porous member, the second amount being wicked away from the first amount of solvent stored in the first layer, wherein the first layer is positioned inside a chamber of the dabbing tool and has a surface defined, at least in part, by an interior surface of the chamber, and wherein the second layer is positioned across an opening of the chamber;
   pressing, using an end effector of a robotic arm, the dabbing tool against the sealant, the sealant sealing a surface of the fastener along a surface of an assembly, the pressing of the dabbing tool shaping an exterior surface of the sealant;
   releasing an amount of solvent from the dabbing tool in response to the pressing, the amount of solvent reducing adhesion between the dabbing tool and the sealant, the amount of solvent being released, at least in part, from the porous member included in the dabbing tool; and
   disengaging the dabbing tool from the sealant after the shaping of the exterior surface of the sealant.

2. The method of claim 1 further comprising:
   providing, from an external reservoir, an additional amount of solvent to the porous member in response to the releasing.

3. The method of claim 2, wherein the additional amount of solvent is received via a port in a housing of the dabbing tool.

4. The method of claim 1, wherein the pressing of the dabbing tool shaping the exterior surface of the sealant reduces a protrusion of the sealant.

5. The method of claim 1 further comprising:
   determining a position of the pressing based on engineering data associated with the assembly.

6. The method of claim 5, wherein the engineering data comprises a three-dimensional representation of the assembly.

7. The method of claim 5 further comprising:
   determining if additional fasteners should be sealed, the determining being based on a plurality of designated positions identified based on the engineering data.

8. The method of claim 1, wherein the sealant is applied by a robotic sealant applicator coupled to a robotic arm.

9. The method of claim 1 further comprising regulating a flow of solvent provided to the porous member using a regulator.

10. A method for applying and shaping sealant on a fastener, the method comprising:
    moving an end effector of a robotic arm to a position to align the end effector with a location of a fastener in an assembly;
    applying, using the end effector, an amount of sealant to the fastener;
    storing a first amount of solvent in a first layer of a porous member of a dabbing tool;
    storing a second amount of solvent in a second layer of the porous member, the second amount being wicked away from the first amount of solvent stored in the first layer, wherein the first layer is positioned inside a chamber of the dabbing tool and has a surface defined, at least in part, by an interior surface of the chamber, and wherein the second layer is positioned across an opening of the chamber;
    pressing, using the end effector, the dabbing tool against the sealant, the sealant sealing a surface of the fastener along a surface of the assembly, the pressing of the dabbing tool shaping an exterior surface of the sealant;
    releasing an amount of solvent from the dabbing tool in response to the pressing, the amount of solvent reducing adhesion between the dabbing tool and the sealant, the amount of solvent being released, at least in part, from the porous member included in the dabbing tool; and disengaging the dabbing tool from the sealant after the shaping of the exterior surface of the sealant.

11. The method of claim 10 further comprising:
rotating, using the end effector, the dabbing tool to face the fastener after the applying of the sealant.

12. The method of claim 11, wherein the rotating rotates, using a rotating component, an orientation of a robotic sealant applicator and the dabbing tool.

13. The method of claim 10 further comprising moving the dabbing tool to a plurality of designated positions using the robotic arm, the plurality of designated positions being determined based on engineering data associated with the assembly.

14. A method for applying acid shaping sealant on a plurality of fasteners, the method comprising:
storing a first amount of solvent in a first layer of a porous member of a dabbing tool;
storing a second amount of solvent in a second layer of the porous member, the second amount being wicked away from the first amount of solvent stored in the first layer, wherein the first layer is positioned inside a chamber of the dabbing tool and has a surface defined, at least in part, by an interior surface of the chamber, and wherein the second layer is positioned across an opening of the chamber;
moving an end effector of a robotic arm to a first fastener at a first position;
pressing, using the end effector, the dabbing tool against a first sealant sealing a first surface of the first fastener along a surface of an assembly, the pressing of the dabbing tool shaping a first exterior surface of the first sealant;
releasing a first amount of solvent from the dabbing tool in response to the pressing, the first amount of solvent reducing adhesion between the dabbing tool and the first sealant, the first amount of solvent being released, at least in part, from the porous member included in the dabbing tool;
disengaging the dabbing tool from the first sealant after the shaping of the first exterior surface of the first sealant;
determining, based on engineering data, if additional fasteners should be sealed; and
moving the end effector to a second fastener at a second position responsive to determining that additional fasteners should be sealed.

15. The method of claim 14 further comprising:
pressing, using the end effector, the dabbing tool against a second sealant sealing a second surface of the second fastener along the surface of the assembly, the pressing of the dabbing tool shaping a second exterior surface of the second sealant;
releasing a second amount of solvent from the dabbing tool in response to the pressing, the second amount of solvent reducing adhesion between the dabbing tool and the second sealant, the second amount of solvent being released, at least in part, from the porous member included in the dabbing tool; and
disengaging the dabbing tool from the second sealant after the shaping of the second exterior surface of the second sealant.

16. The method of claim 14, wherein the first fastener and the second fastener are included in a path of fasteners defined by the engineering data comprising a three-dimensional representation of the assembly.

\* \* \* \* \*